(12) United States Patent
Hane et al.

(10) Patent No.: US 11,305,419 B2
(45) Date of Patent: Apr. 19, 2022

(54) ROBOT TEACHING APPARATUS

(71) Applicant: FANUC CORPORATION, Yamanashi (JP)

(72) Inventors: Mikito Hane, Yamanashi (JP); Hiromitsu Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 405 days.

(21) Appl. No.: 15/925,448

(22) Filed: Mar. 19, 2018

(65) Prior Publication Data

US 2018/0281173 A1 Oct. 4, 2018

(30) Foreign Application Priority Data

Apr. 3, 2017 (JP) .............................. JP2017-073559

(51) Int. Cl.
*B25J 9/00* (2006.01)
*B25J 9/16* (2006.01)
*G05B 19/427* (2006.01)
*B25J 13/06* (2006.01)

(52) U.S. Cl.
CPC ............. *B25J 9/0081* (2013.01); *B25J 9/161* (2013.01); *B25J 9/1664* (2013.01); *B25J 13/06* (2013.01); *G05B 19/427* (2013.01); *G05B 2219/40519* (2013.01)

(58) Field of Classification Search
CPC . B25J 9/0081; B25J 13/06; B25J 9/161; B25J 9/1664; G05B 19/427; G05B 2219/40519
See application file for complete search history.

(56) References Cited

U.S. PATENT DOCUMENTS

| | | |
|---|---|---|
| 5,003,237 A | 3/1991 | Kimura |
| 5,783,922 A | 7/1998 | Hashimoto et al. |
| 5,937,143 A | 8/1999 | Watanabe et al. |
| 6,167,328 A | 12/2000 | Takaoka et al. |

(Continued)

FOREIGN PATENT DOCUMENTS

| | | |
|---|---|---|
| GB | 2226425 A | 6/1990 |
| JP | S58121408 A | 7/1983 |

(Continued)

OTHER PUBLICATIONS

JPO Translation for Takahashi, JP2015182142 (Year: 2015).*

(Continued)

*Primary Examiner* — Ian Jen
(74) *Attorney, Agent, or Firm* — Karceski IP Law, PLLC

(57) ABSTRACT

A complicated motion program is taught, in a simple manner, to a lead-through teachable robot. Provided is a teaching apparatus for a robot, the teaching apparatus being provided with: a movement-instruction input portion that is attached to the robot and with which a movement instruction for the robot is input; and a command input portion with which it is possible to set at least one of a movement-trajectory defining command, a standby command, a speed-changing command, and a work-condition changing command at an arbitrary position on a movement pathway of the robot in a direction that corresponds to the movement instruction input via the movement-instruction input portion.

3 Claims, 4 Drawing Sheets

(56) References Cited

U.S. PATENT DOCUMENTS

| | | | |
|---|---|---|---|
| 2013/0236050 A1 | 9/2013 | Choi et al. | |
| 2015/0290809 A1 | 10/2015 | Nakagawa et al. | |
| 2017/0254709 A1* | 9/2017 | Lauzier | B25J 9/163 |

FOREIGN PATENT DOCUMENTS

| | | | |
|---|---|---|---|
| JP | H01234185 | 9/1989 | |
| JP | H02083185 A | 3/1990 | |
| JP | H02161503 A | 6/1990 | |
| JP | H04040506 | 2/1992 | |
| JP | H05061510 | 3/1993 | |
| JP | H05233052 | 9/1993 | |
| JP | H09062334 | 3/1997 | |
| JP | H09085655 | 3/1997 | |
| JP | 2002120175 A | 4/2002 | |
| JP | 2004351601 | 12/2004 | |
| JP | 2005135095 A | 5/2005 | |
| JP | 2007160471 A | 6/2007 | |
| JP | 2007242054 A | 9/2007 | |
| JP | 2015182142 A | 10/2015 | |
| JP | 2015199174 A | 11/2015 | |
| WO | WO2014-110682 | * 7/2014 | B25J 9/18 |

OTHER PUBLICATIONS

Components of a Force Engineering Mechanics_Review; Date:N/A.*
Japanese Office Action dated Nov. 20, 2018, for Japanese Patent Application No. 2017-073559.
Japanese Office Action dated Feb. 5, 2019, for Japanese Patent Application No. 2017-073559.
Japanese Office Action dated Jul. 28, 2020, for Japanese Patent Application No. 2019-087343.

* cited by examiner

ROBOT TEACHING APPARATUS

CROSS-REFERENCE TO RELATED APPLICATIONS

This application is based on and claims priority to Japanese Patent Application No. 2017-073559, filed on Apr. 3, 2017, the entire contents of which are incorporated herein by reference.

FIELD OF THE INVENTION

The present invention relates to a robot teaching apparatus.

BACKGROUND OF THE INVENTION

In the related art, as a robot teaching apparatus, there is a known apparatus that is based on a so-called lead-through teach system in which: a teach handle and push buttons attached at a distal end of a wrist are provided; an operator grips the teach handle and applies a force thereto, thereby moving a robot to a desired position in accordance with the applied force; and positions of teaching points and speeds thereat are recorded by means of the push buttons (for example, see Japanese Unexamined Patent Application, Publication No. Hei 9-62334).

SUMMARY OF THE INVENTION

An object of the present invention is to provide a robot teaching apparatus with which it is possible to teach, in a simple manner, a complicated motion program to a lead-through teachable robot.

An aspect of the present invention provides a robot teaching apparatus including: a movement-instruction input portion that is attached to a robot and with which a movement instruction for the robot is input; and a command input portion with which it is possible to set at least one of a movement-trajectory defining command, a standby command, a speed-changing command, and a work-condition changing command at an arbitrary position on a movement pathway of the robot in a direction that corresponds to the movement instruction input via the movement-instruction input portion.

In the above-described aspect, the command input portion may be provided with at least one input manipulation portion with which it is possible to set two or more of the commands by alternatively changing the commands.

In the above-described aspect, the input manipulation portion may allow the movement-trajectory defining command to be set during teaching associated with a movement of the robot by means of the movement-instruction input portion, and may allow at least one of the standby command, the speed-changing command, and the work-condition changing command to be set after the movement trajectory has been set.

In the above-described aspect, the command input portion may be a touchscreen-type input apparatus with which it is possible to display the input manipulation portion by changing the details thereof.

DESCRIPTION OF EMBODIMENT(S) OF THE INVENTION

A robot teaching apparatus 1 according to an embodiment of the present invention will be described below with reference to the drawings.

Figure 1:
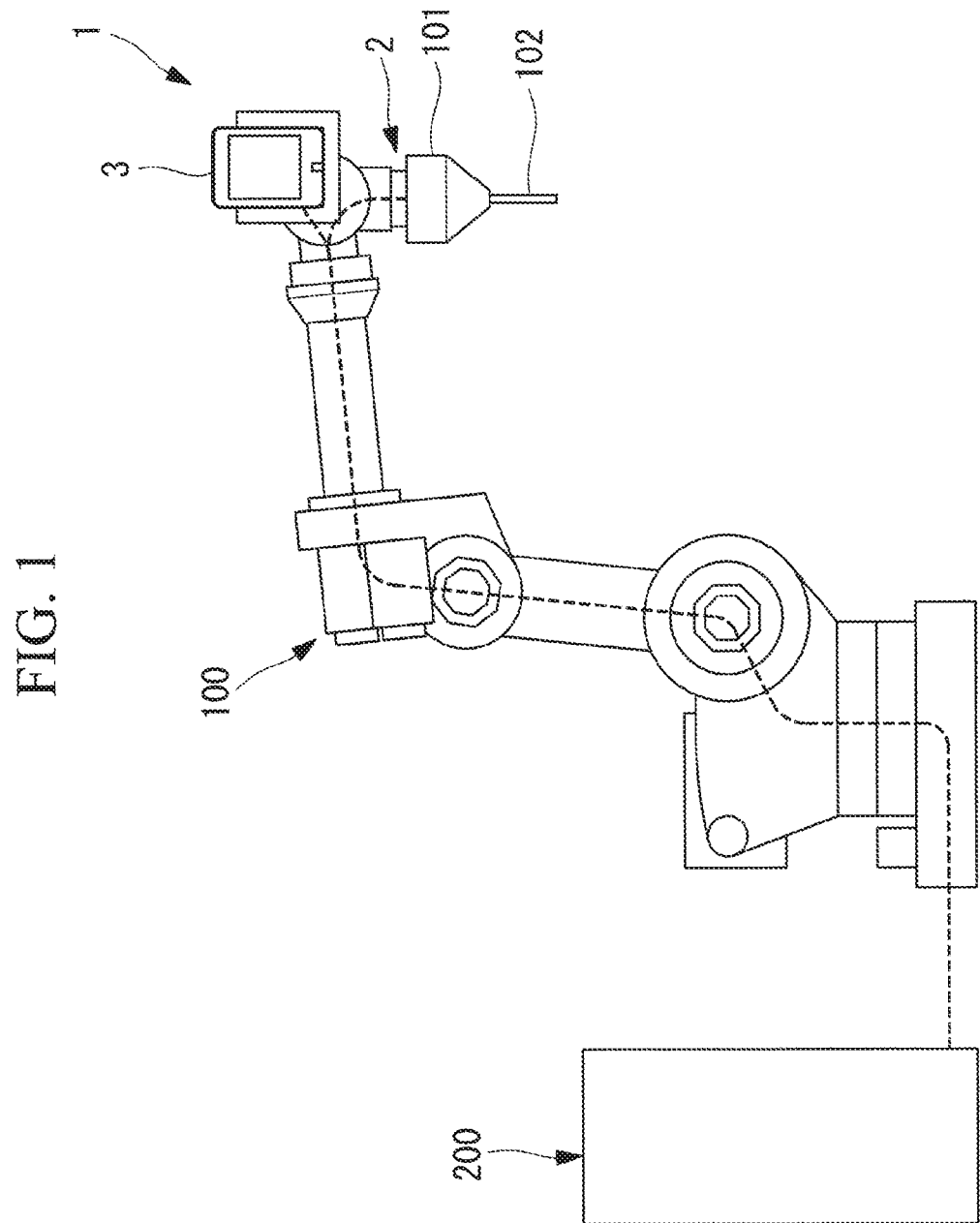
FIG. 1 is an overall configuration diagram showing a robot teaching apparatus according to an embodiment of the present invention.

As shown in FIG. 1, the robot teaching apparatus 1 according to this embodiment is, for example, a teaching apparatus for performing lead-through teaching of an arc-welding robot 100, is provided with a movement-instruction input portion 2 and a command input portion 3, and is connected to a control apparatus 200 that controls the robot 100.

The movement-instruction input portion 2 is configured by securing an arc-welding torch 102 to the distal end of the wrist of the robot 100 via a six-axis force sensor 101. The movement-instruction input portion 2 is configured so that, when an operator A applies a force to the torch 102, the force sensor 101 detects the direction and the magnitude of the applied force, and so that it is possible to input movement instructions for moving the robot 100 at a speed in accordance with the magnitude of the force in the direction of the detected force.

Figure 3:
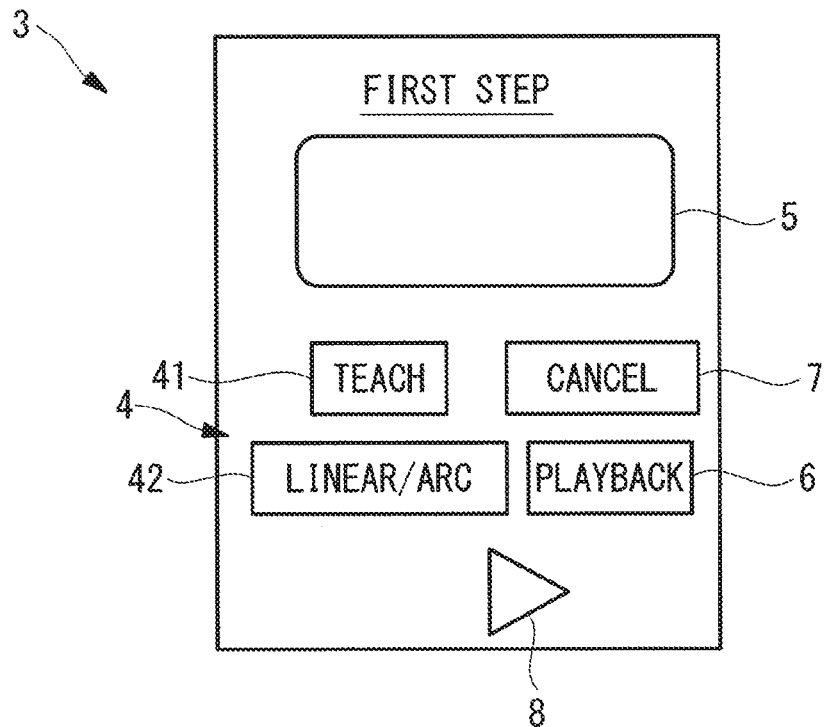
FIG. 3 is a diagram showing examples of the display details of a command input portion in a first step for the teaching apparatus in FIG. 1.

The command input portion 3 is, for example, a touchscreen-type liquid-crystal display device (input apparatus), and is configured so as to display, as shown in FIG. 3, input buttons (input manipulation portions) 4 for setting at least one of a movement-trajectory defining command, a standby command, a speed-changing command, and a work-condition changing command. The command input portion 3 is provided with a setting displaying portion 5 for checking the input setting details.

This embodiment will be explained in terms of an example in which teaching work is performed in three steps.

In a first step, a motion trajectory of the robot 100 is taught. Therefore, as shown in FIG. 3, the input buttons 4 displayed on the command input portion 3 are a "teach" button 41 for recording positions of teaching points and a "linear/arc" button 42 for changing between linear interpolation and arc interpolation when interpolating sections of a trajectory between the individual teaching points and the teaching points in preceding stages thereof. The "linear/arc" button 42 alternatively displays text "linear" or "arc", and a command that defines the position of a teaching point and one of the sections of the displayed motion trajectory is stored at the moment the "teach" button 41 is pressed.

The command input portion 3 displays a "playback" button 6 for checking motions of the robot 100 between the taught teaching points, a "cancel" button 7 for canceling the setting details, and an arrow button 8 for proceeding to a subsequent step.

Figure 2:
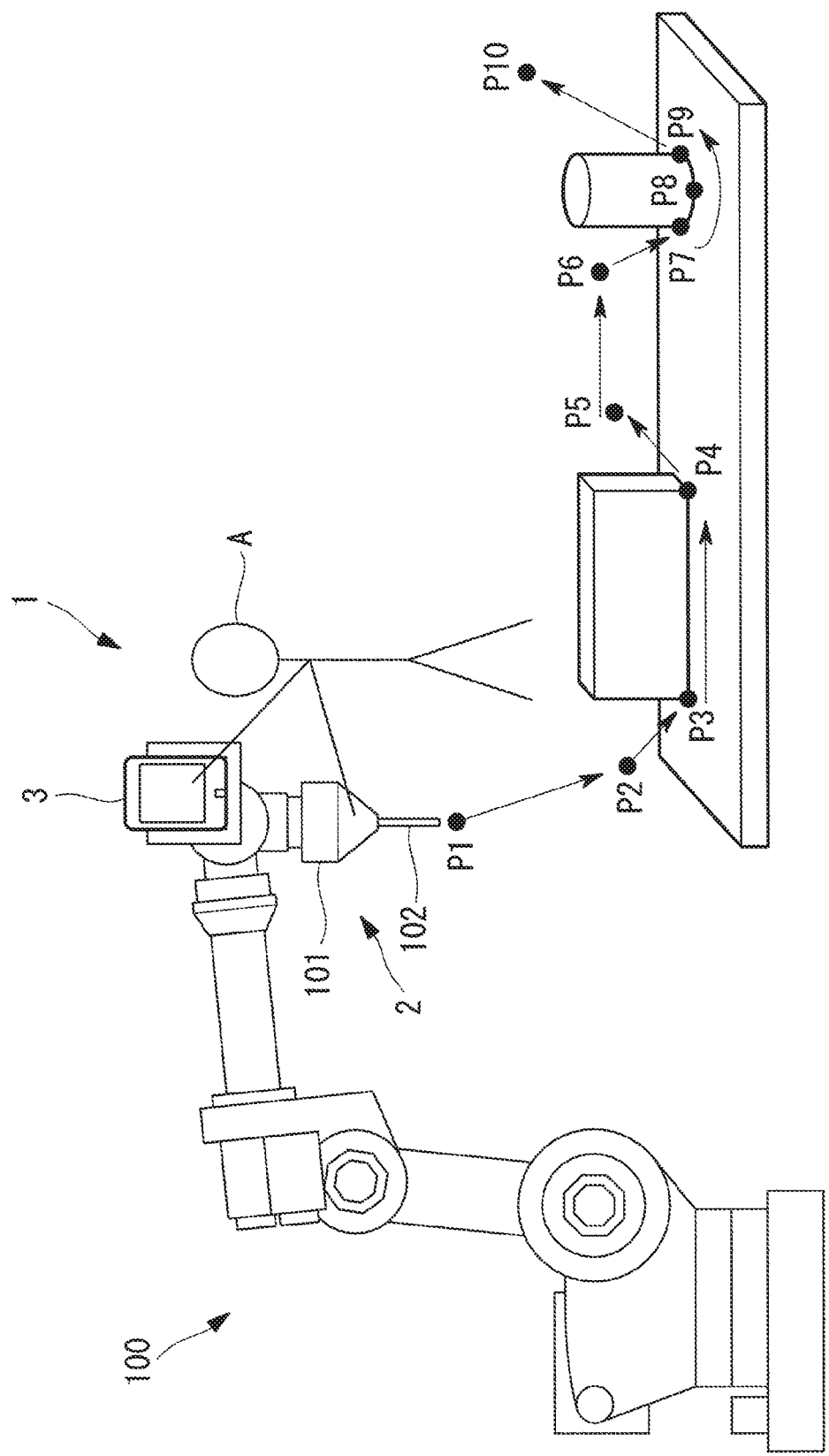
FIG. 2 is a diagram showing examples of teaching points and an example of a movement trajectory in which the teaching apparatus in FIG. 1 is used.

In the example shown in FIG. 2, settings are made such that the arc interpolation is applied to sections among teaching points between a teaching point P7 and a teaching point P9, and the linear interpolation is applied to other sections, namely, sections among teaching points between a teaching point P1 and the teaching point P7, and a section between the teaching point P9 and a teaching point P10.

Figure 4:
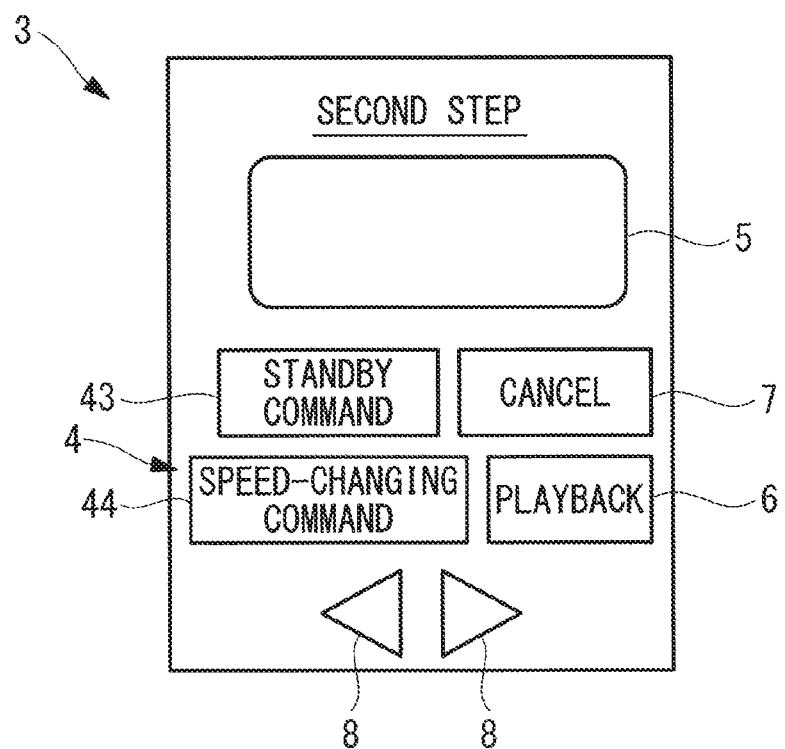
FIG. 4 is a diagram showing examples of the display details of the command input portion in a second step for the teaching apparatus in FIG. 1.

A second step is a step executed after the motion trajectory is set in the first step, and, as shown in FIG. 4, a "standby command" button 43 and a "speed-changing command" button 44 are displayed, with which a standby command and a speed-changing command are input for an arbitrary position on the set motion trajectory. In the example shown in FIG. 4, the "standby command" button 43 is displayed at the position of the "teach" button 41 in the first step, and the "speed-changing command" button 44 is displayed at the position of the "linear/arc" button 42 in the first step.

In the example shown in FIG. 2, a command for standing by for three seconds is set at the teaching points P3, P4, P7, and P9, and the speed is set at 20 mm/s for a section between the teaching points P3 and P4, and the sections among the teaching points between the teaching points P7 and P9, and at 100 mm/s for other sections.

Figure 5:
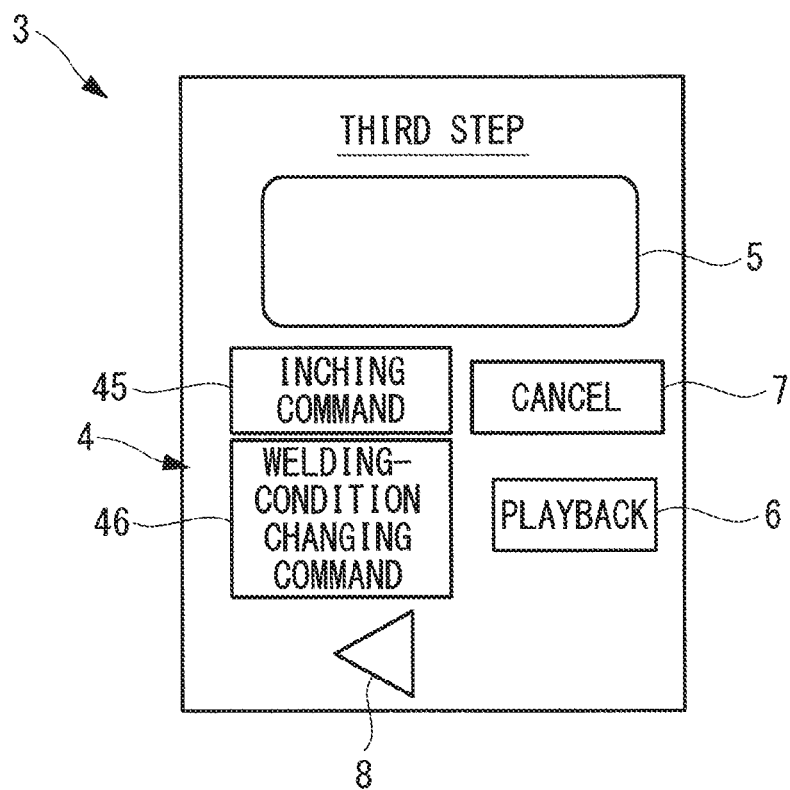
FIG. 5 is a diagram showing examples of the display details of the command input portion in a third step for the teaching apparatus in FIG. 1.

A third step is a step executed after the motion trajectory is set, and, as shown in FIG. 5, buttons 45 and 46 are displayed, with which a command for changing work conditions at an arbitrary position on the set motion trajectory, or the like is input. In the example shown in FIG. 5, an "inching command" button 45 is displayed at the position of the "standby command" button 43 in the second step, and a "welding-condition changing command "button 46 is displayed at the position of the "speed-changing command" button 44 in the second step.

In the example shown in FIG. 2, an inching command is set at the teaching point P3 and the teaching point P7, and the length of a welding wire of the torch 102 is finely adjusted. A first welding condition is set in the section between the teaching points P3 and P4, and a second welding condition is set in the sections among the teaching points between the teaching points P7 and P9.

The operation of the thus-configured robot teaching apparatus 1 according to this embodiment will be described below.

In order to teach a motion program to the robot 100 by using the robot teaching apparatus 1 according to this embodiment, when the operator A grips the welding torch 102 attached to the distal end of the wrist of the robot 100 and applies a force in a direction he/she wishes to move the robot 100, the force sensor 101 detects the magnitude and the direction of the applied force, and the robot 100 undergoes a motion so as to move the torch 102 at a speed in accordance with the magnitude of the force in the direction of the detected force.

As the first step, the operator A presses the "teach" button 41 on the command input portion 3 at the positions of the individual teaching points P1 to P10, while moving the torch 102 sequentially from the teaching points P1 to P10 shown in FIG. 2, while changing the display of the "linear/arc" button 42 to "linear" or "arc", and thus, the positional coordinates of the individual teaching points P1 to P10 and the command for "linear" interpolation or "arc" interpolation are input as information about the teaching points P1 to P10.

Specifically, as shown in FIG. 3, the "linear/arc" button 42 on the command input portion 3 is set to "linear", the "teach" button 41 is pressed at the positions of the teaching points P1 to P7 and the position of the teaching point P10, and thus, the movement trajectory of the torch 102 is set to be generated by means of the linear interpolation for the sections among the teaching points between the teaching points P1 and P7 and the section between the teaching points P9 and P10, which lead to these points. The "linear/arc" button 42 is changed to "arc" at the positions of the teaching points P8 and P9, the "teach" button 41 is subsequently pressed, and thus, the movement trajectory of the torch 102 is set to be generated by means of the arc interpolation for the sections among the teaching points between the teaching points P7 and P9, which lead to these points.

The operator A checks the motion trajectory of the robot 100 by pressing the "playback" button 6, as needed, and, in the case in which a correction is needed, it is possible to perform the correction in a simple manner by, after pressing the "cancel" button 7 at the position of the teaching point to be corrected among the teaching points P1 to P10, correcting the position thereof to the correct position and pressing the "teach" button 41 again. The setting details for the individual teaching points P1 to P10 may be checked by means of the display details on the setting displaying portion 5.

After completing input of the information that defines a manipulation trajectory, in other words, the positional coordinates of the individual teaching points P1 to P10 and distinctions between the "linear" interpolation and the "arc" interpolation, when the operator A presses the arrow button 8, thus proceeding to the second step, as shown in FIG. 4, the "standby command" button 43 is displayed at the position at which the "teach" button 41 was displayed on the command input portion 3 in the first step, and the "speed-changing command" button 44 is displayed at the position at which the "linear/arc" button 42 was displayed in the first step.

As the second step, the operator A moves the torch 102 in accordance with the defined motion trajectory while pressing the "playback" button 6, and presses the "standby command" button 43 shown in FIG. 4 at a desired position on the motion trajectory. By doing so, the standby command for standing by at that position is set. The standby time determined by setting the standby command may be set in advance.

Specifically, by pressing the "standby command" button 43 at the teaching points P3, P4, P7, and P9 shown in FIG. 2, the standby command for the standby time of 3 seconds, which is set in advance, is set.

As the second step, the operator A moves the torch 102 in accordance with the defined motion trajectory while pressing the "playback" button 6, and presses the "speed-changing command" button 44 shown in FIG. 4 at a desired position on the motion trajectory. By doing so, it is possible to change the speed at that position. The value of the speed set by pressing the "speed-changing command" button 44 may be set in advance.

Specifically, the motion speed to the teaching points at which the "speed-changing command" is not set is set to be 100 mm/s, and, by pressing the "speed-changing command" button 44 at the teaching points P4, P8, and P9 shown in FIG. 2, the motion speed between the teaching points P3 and P4 and that between the teaching points P7 and P9 are set to be 20 mm/s.

The operator A can return to the previous step by pressing the arrow button 8, as needed.

Next, when the operator A presses the arrow button 8 and proceeds to the third step, as shown in FIG. 5, the "inching command" button 45 is displayed at the position at which the "standby command" button 43 was displayed on the command input portion 3 in the second step, and the "welding-condition changing command" button 46 is displayed at the position at which the "speed-changing command" button 44 was displayed in the second step.

As the third step, the operator A moves the torch 102 in accordance with the defined motion trajectory while pressing the "playback" button 6, and presses the "inching command" button 45 shown in FIG. 5 at a desired position on the motion trajectory. By doing so, the welding wire is set so as to be fed at that position.

Specifically, by pressing the "inching command" button 45 at the positions of the teaching points P3 and P7 shown in FIG. 2, settings are made for inching.

As the third step, the operator A moves the torch 102 in accordance with the defined motion trajectory while pressing the "playback" button 6, and presses the "welding-condition changing command" button 46 shown in FIG. 5 at a desired position on the motion trajectory. Welding conditions include, for example, settings for currents, voltages, or the like supplied to the welding wire when performing welding. Combinations of these values may be prepared and selected as preset-patterns. By doing so, the welding conditions are changed and set at that position.

Specifically, by pressing the "welding-condition changing command" button 46 once at the teaching point P4 shown in FIG. 2, the first welding condition is set in the section between the teaching points P3 and P4. By pressing the "welding-condition changing command" button 46 twice at the teaching points P8 and P9, the second welding condition is set in the sections among the teaching points between the teaching points P7 and P9.

As has been described above, with the robot teaching apparatus 1 according to this embodiment, there is an advantage in that it is possible not only to set the positional coordinates of the teaching points but also to teach, in a simple manner, a complicated motion program including various commands.

Also, in this case, with the robot teaching apparatus 1 according to this embodiment, because the command input portion 3 is constituted of a liquid-crystal display device, and the buttons (input manipulation portions) 4 that are displayed at the same positions are changed among the three steps, it is possible to input a number of commands that is equal to or greater than the number of the buttons 4.

As a result, it is possible to reduce the size of the command input portion 3 and to easily install the command input portion 3 in the vicinity of the wrist of the robot 100, at which it is difficult to ensure a large enough installation space.

There is also an advantage in that it is possible to input only the commands required in each step, thus preventing an erroneous manipulation.

Figure 6:
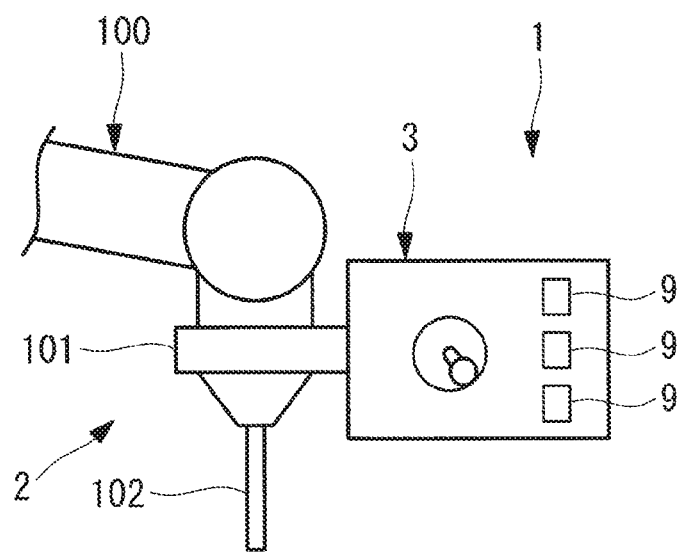
FIG. 6 is a diagram showing a modification of the teaching apparatus in FIG. 1.

The robot teaching apparatus 1 according to this embodiment has been described in terms of an example in which, as the movement-instruction input portion 2, the force sensor 101 is disposed between the distal end of the wrist and the welding torch 102, and the magnitude and the direction of the force that the operator A has applied to the torch 102 are detected; however, alternatively, as shown in FIG. 6, another movement-instruction input portion, such as a joystick or a trackball (not shown), that can detect the magnitude and the direction of the force applied by the operator A may be employed.

Although a liquid-crystal display device has been described as an example of the command input portion 3, there is no limitation thereto, and a plurality of buttons 9 may be arrayed, as shown in FIG. 6. For example, the buttons 9 may be arrayed in the same number as the number of commands that can be input, and only the buttons 9 for the required commands may be lit in each step, thus indicating that it is possible to perform inputs therewith. By doing so, it is possible to prevent an erroneous manipulation in a similar manner to the case of the liquid-crystal display device.

Inputs from all of the buttons may be allowed in a single step without dividing the procedures into multiple steps. This method allows arbitrary input setting without choosing a step.

The buttons 9 may be arrayed in a number that is less than the number of commands that can be input, and the commands that are input by means of the buttons 9 may be changed in separate steps.

Although this embodiment has been described in terms of an example of the arc-welding robot 100, there is no limitation thereto, and the present invention may be applied to a laser-processing robot, a sealing robot, and a hemming robot. The details of commands to be prepared may be set, as appropriate, in accordance with the usages of the individual robots.

As a result, the following aspect is derived from the above described embodiment.

An aspect of the present invention provides a robot teaching apparatus including: a movement-instruction input portion that is attached to a robot and with which a movement instruction for the robot is input; and a command input portion with which it is possible to set at least one of a movement-trajectory defining command, a standby command, a speed-changing command, and a work-condition changing command at an arbitrary position on a movement pathway of the robot in a direction that corresponds to the movement instruction input via the movement-instruction input portion.

With this aspect, when an operator manipulates the movement-instruction input portion attached to the robot and inputs the movement instruction for the robot, it is possible to move the robot on the basis of the movement instruction. Also, at an arbitrary position on the movement pathway of the robot, it is possible to set, by means of the command input portion, at least one of the movement-trajectory defining command, the standby command, the speed-changing command, and the work-condition changing command. By doing so, it is possible to teach, in a simple manner, a complicated motion program, which includes commands other than teaching points, to a lead-through teachable robot.

In the above-described aspect, the command input portion may be provided with at least one input manipulation portion with which it is possible to set two or more of the commands by alternatively changing the commands.

By doing so, it is possible to set the number of input manipulation portions in the command input portion to be less than the number of commands that can be input, and thus, it is possible to reduce the size of the teaching apparatus to be attached to a limited region on the robot.

In the above-described aspect, the input manipulation portion may allow the movement-trajectory defining command to be set during teaching associated with a movement of the robot by means of the movement-instruction input portion, and may allow at least one of the standby command, the speed-changing command, and the work-condition changing command to be set after the movement trajectory has been set.

By doing so, it is possible to set the movement trajectory in a simple manner by setting the movement-trajectory defining command such as a command that defines teaching points and interpolation methods for sections among the teaching points while moving the robot by means of the movement-instruction input portion, and it is possible to set, at an arbitrary point on the movement trajectory, other commands that are not related to setting of the movement trajectory after setting the movement trajectory. By doing so, it is possible to separate the stage in which the commands are set by using the input manipulation portion into a stage in which the movement trajectory is set and a stage thereafter. As a result, it is possible, by decreasing the number of commands that can be input in the individual stages, to set the number of input manipulation portions to be less than the number of commands that can be input, and thus, it is possible to reduce the size of the teaching apparatus to be attached to a limited region on the robot.

In the above-described aspect, the command input portion may be a touchscreen-type input apparatus with which it is possible to display the input manipulation portion by changing the details thereof.

By doing so, it is possible to display the input manipulation portion for inputting different kinds of commands by easily changing the details displayed at the same positions therein, and thus, it is possible to reduce the size of the command input portion.

The invention claimed is:

1. A robot teaching apparatus, comprising:
    a sensor that is attached to a robot and that detects a direction and a magnitude of a force applied to the robot; and
    a liquid-crystal display device configured to switch and display a plurality of button groups that are different from each other, wherein the liquid-crystal display device:
    displays a first button group of the plurality of button groups;
    defines a movement trajectory of the robot in response to actuation of the displayed first button group and the direction and the magnitude of the force detected by the sensor;
    displays a second button group of the plurality of button groups as an alternative to the first button group in response to defining the movement trajectory of the robot; and
    defines at least one of a position of making the robot standby on the defined movement trajectory and a position of making a speed of the robot be changed on the defined movement trajectory in response to actuation of the displayed second button group.

2. The robot teaching apparatus according to claim 1, wherein the liquid-crystal display device:
    displays a third button group of the plurality of button groups as an alternative to the second button group in response to defining at least one of the position of making the robot standby on the defined movement trajectory and the position of making the speed of the robot be changed in the defined movement trajectory; and
    defines a position of changing conditions of a work to be made by the robot on the defined movement trajectory in response to actuation of the displayed third button group.

3. The robot teaching apparatus according to claim 2, wherein:
    in response to actuation of a predetermined button of the second button group while the second button group is displayed, the liquid-crystal display device displays the first button group as an alternative to the second button group, and
    in response to actuation of a predetermined button of the third button group while the third button group is displayed, the liquid-crystal display device displays the second button group as an alternative to the third button group.

* * * * *